United States Patent
Daneels et al.

(10) Patent No.: US 10,872,729 B2
(45) Date of Patent: Dec. 22, 2020

(54) ELECTRICAL ENERGY STORAGE DEVICE AND METHOD FOR PRODUCING AN ELECTRICAL ENERGY STORAGE DEVICE

(71) Applicant: Rogers BVBA, Ghent (BE)

(72) Inventors: Jan Daneels, De Pinte (BE); Sebastian De Boodt, Lochristi (BE)

(73) Assignee: ROGERS BVBA, Ghent (BE)

( * ) Notice: Subject to any disclaimer, the term of this patent is extended or adjusted under 35 U.S.C. 154(b) by 98 days.

(21) Appl. No.: 16/182,212

(22) Filed: Nov. 6, 2018

(65) Prior Publication Data

US 2019/0180942 A1    Jun. 13, 2019

(30) Foreign Application Priority Data

Nov. 7, 2017  (EP) ..................... 17200405

(51) Int. Cl.
| | |
|---|---|
| *H01G 4/38* | (2006.01) |
| *H01G 4/40* | (2006.01) |
| *H01G 2/06* | (2006.01) |
| *H01G 4/228* | (2006.01) |
| *H01G 4/32* | (2006.01) |
| *H01G 11/10* | (2013.01) |
| *H01G 11/08* | (2013.01) |
| *H01G 2/22* | (2006.01) |

(52) U.S. Cl.
CPC .............. *H01G 4/38* (2013.01); *H01G 2/06* (2013.01); *H01G 4/228* (2013.01); *H01G 4/32* (2013.01); *H01G 4/40* (2013.01); *H01G 2/22* (2013.01); *H01G 11/08* (2013.01); *H01G 11/10* (2013.01)

(58) Field of Classification Search
CPC .. H01G 2/04; H01G 2/02; H01G 4/32; H01G 4/38

See application file for complete search history.

(56) References Cited

U.S. PATENT DOCUMENTS

| | | | |
|---|---|---|---|
| 2013/0094122 A1 | 4/2013 | Domes et al. | |
| 2013/0271941 A1 | 10/2013 | Guan et al. | |
| 2013/0335881 A1* | 12/2013 | Atsumi | H01G 11/74 361/303 |
| 2015/0340157 A1 | 11/2015 | Wen et al. | |

FOREIGN PATENT DOCUMENTS

| | | | |
|---|---|---|---|
| CN | 205666408 U | 10/2016 | |
| CN | 106231810 A | 12/2016 | |
| DE | 202015004662 U1 | 10/2015 | |
| DE | 102016106835 B3 | 6/2017 | |
| JP | 2000195578 A | 7/2000 | |
| WO | 2011018434 A2 | 2/2011 | |
| WO | WO-2014129263 A1 * | 8/2014 | ............... H01G 2/08 |

* cited by examiner

*Primary Examiner* — Eric W Thomas
(74) *Attorney, Agent, or Firm* — Cantor Colburn LLP

(57) ABSTRACT

An electrical energy storage device (1) includes several capacitors (2), and a busbar (5) for electric power distribution, wherein the busbar (5) is covered at least partially by an insulation layer (21) and the capacitors (2) are connected to the busbar (5). The capacitors can be arranged on the busbar for reducing an inductance. In particular, the capacitors can be arranged directly on the insulation layer (21) of the busbar (5).

16 Claims, 4 Drawing Sheets

Figure 1A:
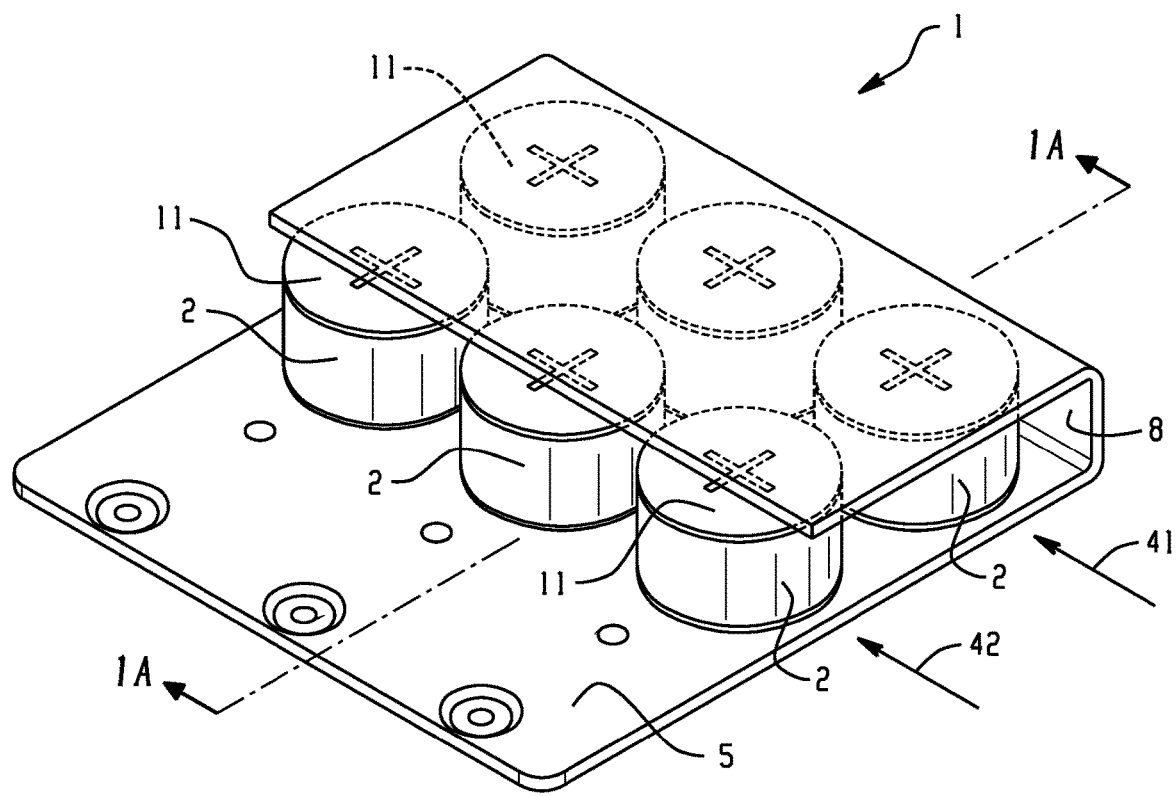

ELECTRICAL ENERGY STORAGE DEVICE AND METHOD FOR PRODUCING AN ELECTRICAL ENERGY STORAGE DEVICE

CROSS REFERENCE TO RELATED APPLICATIONS

This application claims the benefit of EP Application No. 17200405.3, filed Nov. 7, 2017, the contents of which are incorporated herein by reference in their entirety.

The present invention describes an electrical energy storage device and a method for producing an electrical energy storage device.

Electrical energy storage devices are well known in the prior art. Typically, several capacitors are included in such an electrical energy storage device for forming a capacitor bar. In particular, these capacitors are connected in parallel and/or in series for realizing the desired total capacity of the electrical energy storage device. However, when applying a voltage or a current to such a capacitor assembly, power dissipation takes place and heat is generated. As a consequence, the generated power dissipation influences the electrical characteristics, the life time and the reliability of the electrical energy storage device negatively.

It is therefore an object of the present invention to provide an electrical energy storage device having a reduced power dissipation for improving the electrical characteristics, the life time and the reliability of the electrical energy storage device positively, especially by lowering the inductance and hence the impedance of the device.

This object is achieved by the electrical energy storage device and by a method for producing an electrical energy storage device according to the present disclosure.

According to a first aspect of the present invention an electrical energy storage device, comprising
  several capacitors, and
  a busbar for electric power distribution,
is disclosed wherein the busbar is covered at least partially by an insulation layer and the capacitors are connected to the busbar, in particular electrically connected to the busbar, wherein, for reducing an inductance, the capacitors are arranged on the busbar, in particular on the insulation layer of the bus bar.

In contrast to the state of the art it is provided according to the present invention to arrange the capacitors on the busbar such that the total inductance of the assembly comprising the capacitors and busbar is reduced. As a consequence, the heat energy, i. e. the heat produced by the electrical energy storage device, is influenced and thus reduced. In particular, the heat energy J assigned to a voltage overshoot during switching off is $$J = I^2 \cdot t \left[ R + \left( 2\pi f L - \frac{1}{2\pi f C} \right) \right],$$

wherein the time (t)-dependent heat energy J further depends on a current (I), a resistance (R), a frequency (f), a capacitance (C) and the inductance (L). As a consequence, the heat energy can be reduced by decreasing the inductance.

Preferably, it is provided that the capacitors are arranged directly on the busbar such that the capacitors, in particular each capacitor of the assembly, is spaced from the busbar only by the insulation layer. In particular, the insulation layer is a lamination that covers the busbar. As a result, it is advantageously possible to reduce the inductance by arranging the capacitors, in particular all capacitors, on the busbar and consequently to enhance the electrical characteristics, the lifetime and the reliability of the electrical energy storage device.

The term "busbar" preferably describes a metallic strip or bar. Further, the busbar is isolated by using the insulation layer and therefore differs from busbars from the state of the art that are generally uninsulated. Preferably, the busbar is covered by the insulation layer at least in the region, where the capacitors are arranged on the busbar. Alternatively or additionally, it is possible that a part of the busbar being covered is greater than a part of the busbar being not covered. For example, only a side facing the capacitors is laminated. In particular, a thickness of the insulation layer is between 50 μm and 800 μm, more preferably between 100 μm and 500 μm and most preferably between 150 μm and 200 μm.

Particularly advantageous embodiments and features of the invention are specified by the dependent claims and further defined in the following description. Features of different claim categories may be combined as appropriate to give further embodiments not described herein.

According to one embodiment it is provided that at least one capacitor is free from an insulation wrap, i.e. the capacitor is uninsulated or "naked." Preferably, all capacitors are uninsulated. As a consequence, insulation wraps can be avoided and therefore material cost can be saved. Preferably, the uninsulated capacitors are separated from each other by a distance between 0.5 mm and 5 mm, more preferably by a distance between 0.8 mm and 2.5 mm and most preferably by a distance between 1.1 mm and 1.5 mm. Thus, it is possible to arrange the capacitors as close as possible to each other without a negative electrical or thermal interaction between the capacitors. Furthermore, it is provided that the capacitors are arranged such that a positive contact and a negative contact of the capacitors are located at opposite ends of the capacitors and wherein preferably either the positive contact or the negative contact directly faces the busbar.

Preferably, it is provided that the busbar comprises a first conductive layer and a second conductive layer, wherein the first conductive layer and the second conductive layer are insulated from each other by a further insulation layer in between and are arranged about each other. In particular, the first conductive layer, the second conduct layer and the further insulation layer are stacked on each other for forming the busbar. Preferably, the busbar provides an area for attaching the capacitors to the busbar. Thereby the first conductive layer, the second conductive layer and the insulation layer mainly extend in a plane perpendicular to the direction of stacking. In particular, the busbar extends further from the area for attaching the capacitors, in particular in a direction perpendicular to the direction of stacking. For example, the capacitors are located at an edge of the busbar or in a region of the busbar, preferably a rim region. Thus, it is advantageously possible, to connect the positive or negative contacts of the capacitors directly with the first and/or second conductive layer without reaching through the busbar. In particular, the capacitors are located at one end of the busbar. Furthermore, it is provided that a width of the busbar is constant over its extension, in particular in a direction perpendicular to the direction of stacking. It is also possible that the width of the busbar in the area for attaching the capacitors differs from the width of the busbar outside the area for attaching the capacitors. Thus, it is advantageously possible to adapt the size of the area for attaching the capacitors to the number of capacitors.

According to another embodiment, it is provided that the capacitors are connected to the first conductive layer and/or the second conductive layer by reaching through the insulation layer, in particular by using an interlayer connection. Thus, it is possible to connect the positive and the negative contacts of the capacitors, in particular the positive or negative contacts facing to the busbar, to the first conductive layer or the second conductive layer, respectively, by the shortest path. For establishing the contacts to the first conductive layer or the second conductive layer, the insulation layer is intermitted or interrupted or structured such that the interlayer connection can reach through the insulation layer. Preferably, the intermitted region in the insulation layer is smaller than a cross-section of the capacitor in a plane being perpendicular to the direction of stacking. Thus, it is guaranteed that the capacitors can both rest on the insulation layer and reach through the insulation layer. Preferably, the intermitted region is located under the capacitor or in a region between two capacitors. For example, the interlayer connection is realized by a via.

In particular, it is provided that the respective capacitor is connected to the first conductive layer and/or the second conductive layer by a connector means, for example a flexible connector means, or a further connector mean. Thus, it is possible to connect the contacts of the capacitors, in particular the contacts facing away from the busbar, to the first conductive layer or the second conductive layer. Preferably, the connector means at least partially surround at least one, preferably several capacitors. It is also conceivable that at least one connector means surrounds the busbar at least partially. Furthermore, it is provided that several capacitors, for example all capacitors, share a common connector means.

Preferably, it is provided that the connector means is configured such that for fixing the capacitors in an assembled state, a clamping force affects the capacitors. Thus it is possible to fix the capacitors by using the connector means without using any further fixing means. In particular, the flexible or elastic connector means is pretensioned such that the clamping force is established. As a consequence, the connector means has a double function.

According to another preferred embodiment, it is provided that the capacitors, being arranged next to each other on the busbar, are connected in series and/or in parallel for producing a capacitor bank. Thus, it is possible to realize a desired total capacity assigned to the capacitor bank.

In a preferred embodiment, it is provided that the capacitors are orientated such that
all negative contacts or all positive contacts face away from the busbar,
all negative contacts facing away from the busbar are located in a first row and all positive contacts facing away from the busbar are located in a second row or
a negative contact facing away from the busbar is located adjacent to a positive contact facing away from the busbar in the first row and/or the second row.

Thus, it is advantageously possible to reduce the inductance and thereby also the impedance by orientating the capacitors. In particular by inverting the orientation of adjacent capacitors the inductances cancel each other at least partially. Therefore, the total inductance of the assembly can be reduced by increasing the number of adjacent capacitors being orientated in opposite directions. As a consequence, the embodiment, wherein a negative contact facing away from the busbar is located adjacent to a positive contact facing away from the busbar in the first row and the second row, is preferably realized according to the invention. In particular, it is possible that a negative contact facing away from the busbar and being located in the first row is located adjacent to a positive contact facing away from the busbar and being located in the second row. Thus the inductance is further reduced.

According to another embodiment it is provided that a first set of capacitors is arranged in the first row and a second set of capacitors is arranged in the second row, wherein
the first set of capacitors and the second set of capacitors are connected to the first conductive layer by a common connector means,
the first set of capacitors is connected to the first conductive layer by the connector mean and the second set of capacitors is connected to the first conductive layer by the further connector mean and/or
the capacitors of the first set of capacitors and the capacitors of the second set of capacitors are each connected to the first conductive layer by the connector means or the further connector means individually.

Thus, it is possible to connect the negative and positive contacts to the corresponding first conductive layer or the second conductive layer, depending on the orientation of the capacitors. By sharing a common connector means the production of the electrical energy storage device is advantageously simplified.

The invention further provides that the further connector means reaches through the insulation layer and/or the further insulation layer. Such a connector means establishes a connection to the first conductive layer and/or to the second conductive layer, in particular without surrounding the busbar. As a consequence, a compact arrangement is realized. In particular, it is provided that the region for reaching through the insulation layer and/or the further insulation layer is located between two capacitors, in particular between a capacitor of the first row and a capacity of the second row.

In another embodiment it is provided that the capacitors comprise
a metallized film being winded; and/or
a dielectric comprising polyethylene terephthalate (PET), polyethylene naphthalate (PEN), polyphenylene sulphide (PPS), polypropylene (PP), polycarbonate (PC) and/or the like; and/or
a positive and a negative contact made from metal being sprayed.

Furthermore, it is provided that the arrangement comprising the capacitor, the connector means and at least a part of the busbar is arranged in a casing. For example, the casing is made from metal and/or plastic. It is also possible that the casing is additionally filled with an epoxy, polyurethane and/or the like for fixing the arrangement inside the casing.

Another aspect of the present invention is a method for producing an electrical energy storage device, in particular according to one or more of the above-mentioned embodiments, comprising the steps of:
providing a bus bar,
covering the busbar at least partially by an insulation layer,
arranging several capacitors on the insulation layer, and
connecting the capacitors to the busbar.

According to an embodiment it is provided that the capacitors are orientated on the busbar such that the inductance of the assembly of capacitors is minimized. Preferably, the capacitors are located at an edge of the busbar. It is also possible that the electrical energy storage device is arranged at least partially in a casing.

Figure 1B:
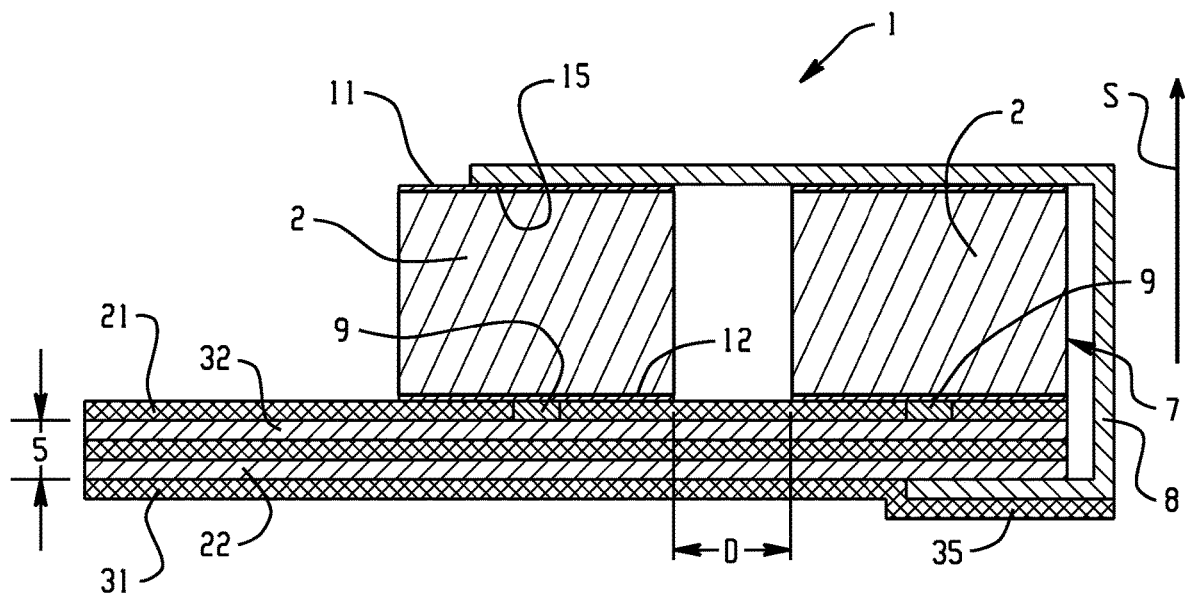
Figure 2A:
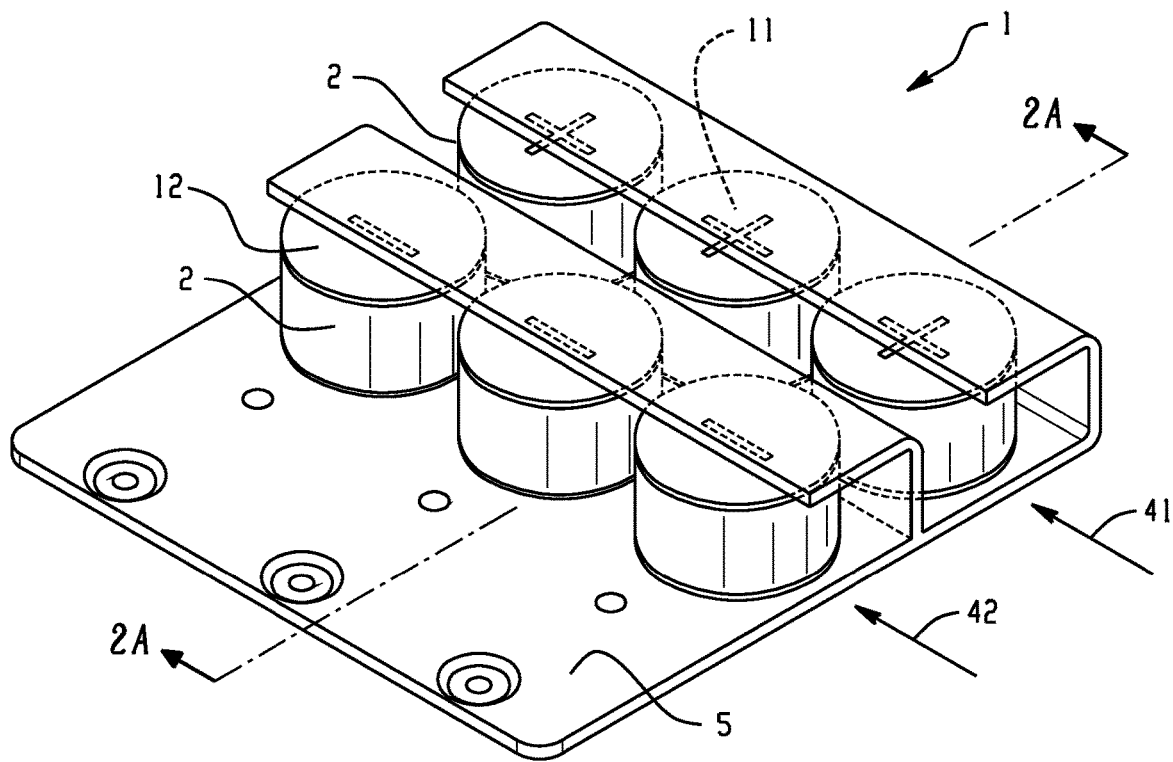
Figure 2B:
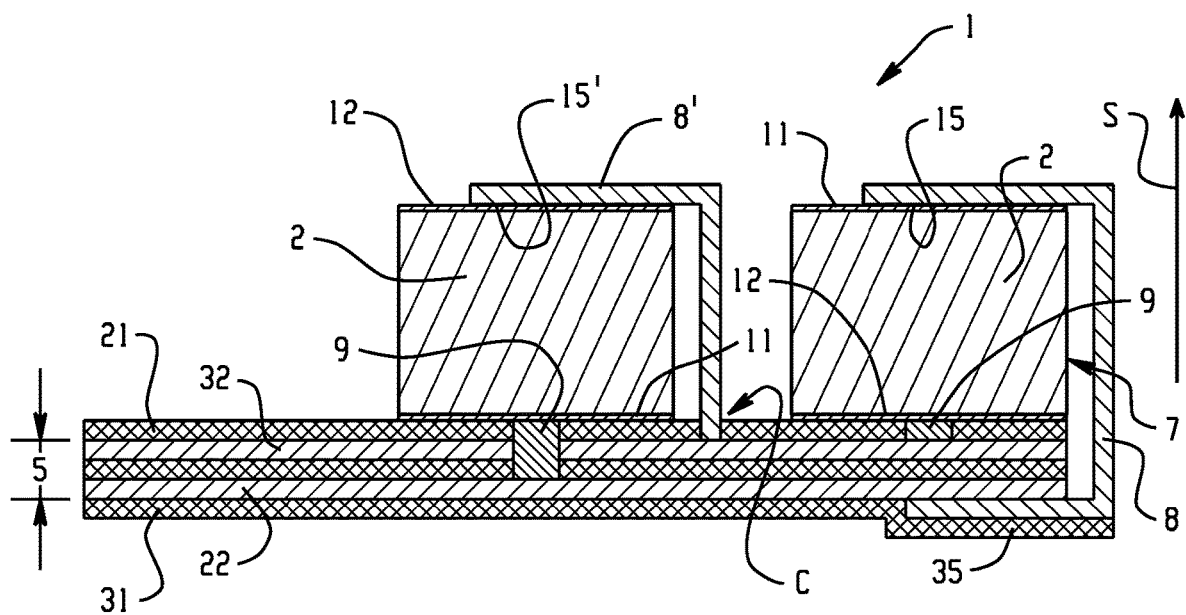
Figure 3A:
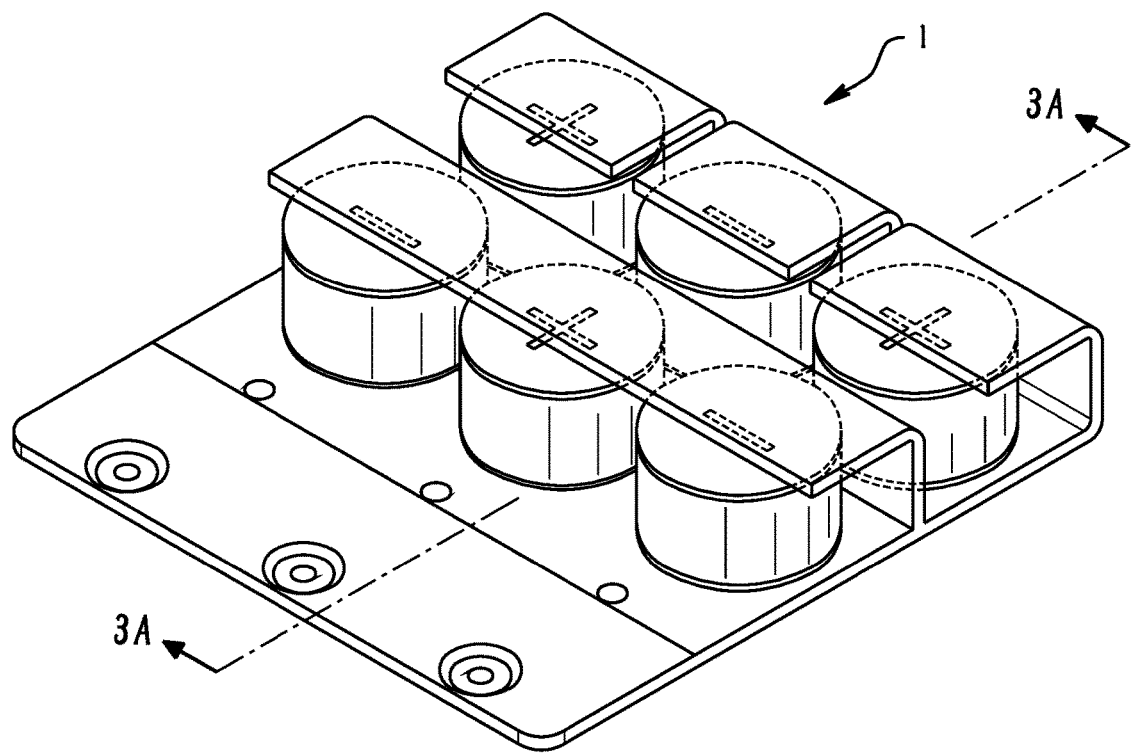
Figure 3B:
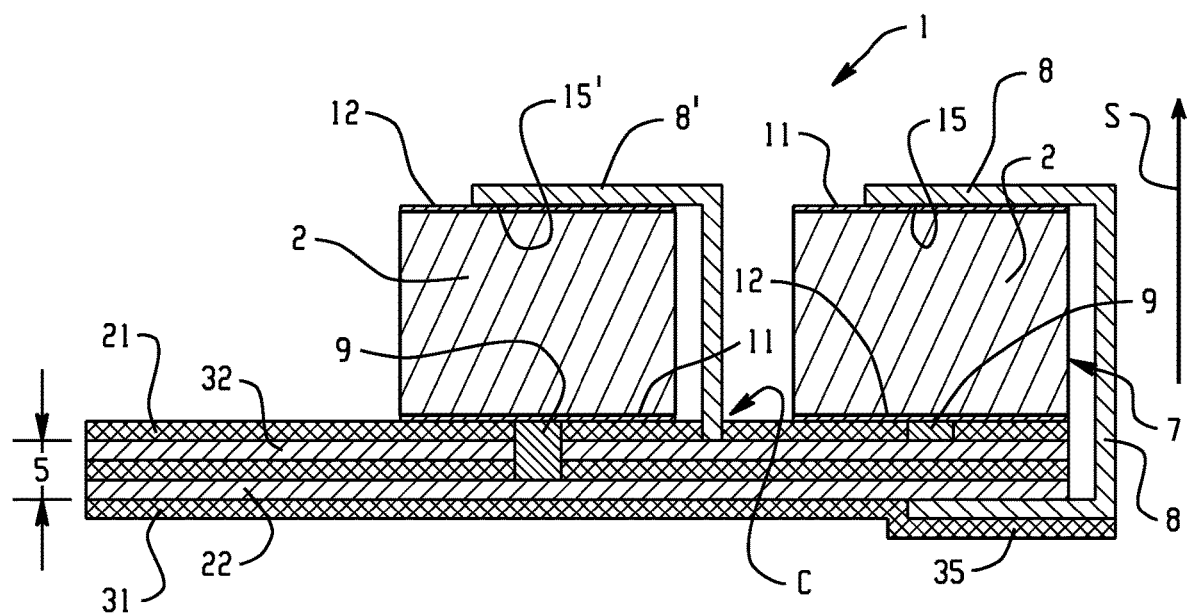

In the drawings:

FIGS. 1a and 1b show schematically an electrical energy storage device according to a first embodiment of the present invention, FIGS. 2a and 2b show schematically an electrical energy storage device according to a second embodiment of the present invention, and FIGS. 3a and 3b show schematically an electrical energy storage device according to a third embodiment of the present invention.

Figure 4:
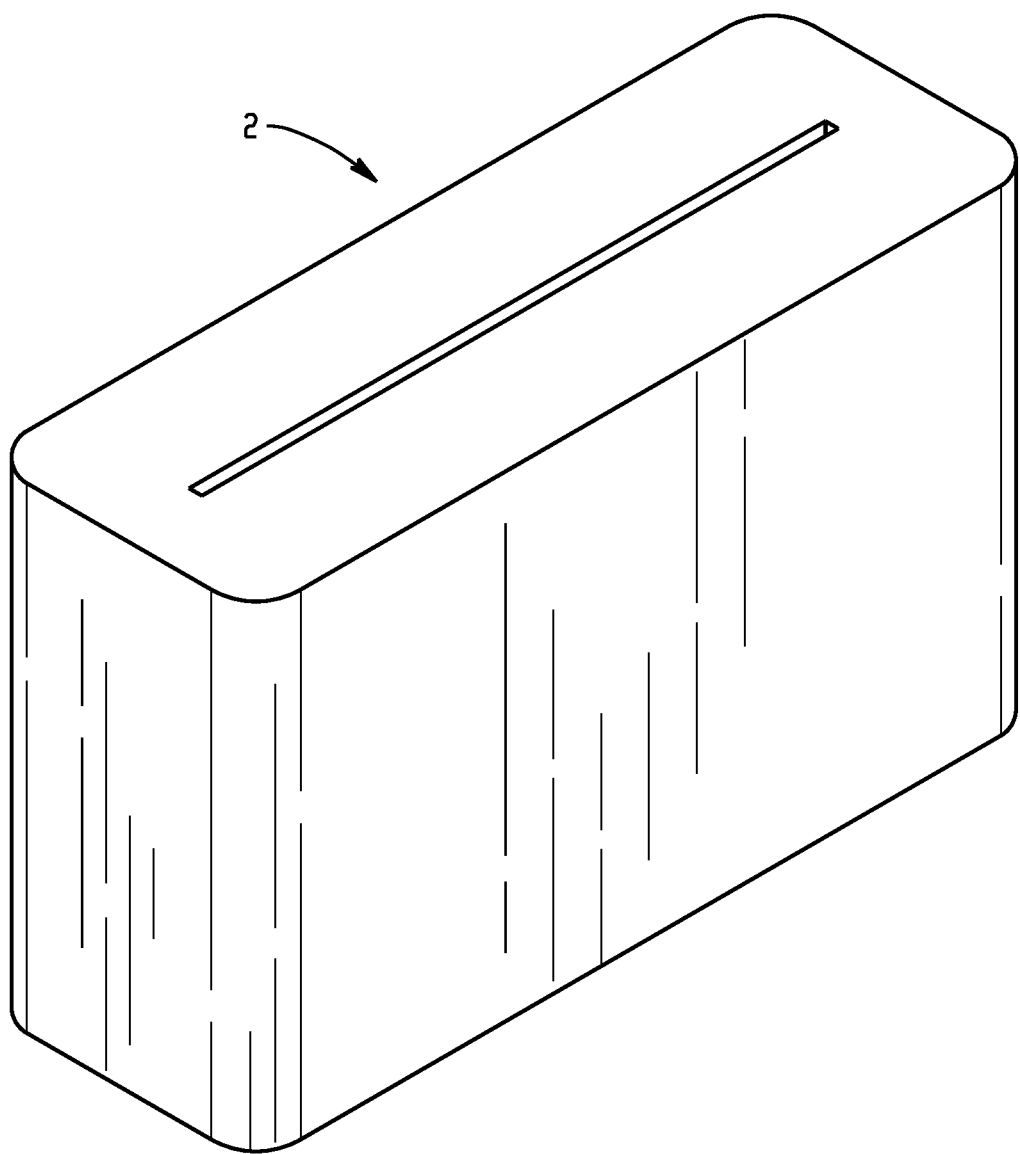

FIG. 4 shows another kind of capacitor.

In FIGS. 1a and 1b an electrical energy storage device 1 according to a first embodiment is schematically presented in a perspective view (FIG. 1a) and in a cross-sectional view (FIG. 1b) along the A-A line. In general, the electrical storage device 1 comprises several capacitors 2 being connected to each other for realizing a capacitor bank. For example, the capacitor bank illustrated in FIG. 1 is built up by six capacitors 2 having a capacity of 150 μF/900 Vdc. As a result, the capacitor bank has a total capacity of 900 μF/900 Vdc.

Preferably, at least one or several capacitors 2, in particular all capacitors 2, comprise a metallized film being winded, i. e. such a capacitor 2 is realized by winding the metallized film. Thereby the film is metallized on both sides. By adjusting the number of windings it is advantageously possible to determine a desired capacity of the corresponding capacitor 2. As a result of winding the metalized film the capacitors 2 have a cylindrical shape. Furthermore, it is provided that the capacitor 2 comprises a dielectric having polyethylene terephthalate (PET), polyethylene naphthalate (PEN), polyphenylene sulphide (PPS), polypropylene (PP), polycarbonate (PC) and/or the like.

Further, the capacitor 2 has a positive contact 11 and a negative contact 12 usually at opposite ends of the capacitor 2. For example, the positive contact 11 and the negative contact 12 are formed by metals sprayed by tin (Sn) or another metal. The capacitors 2 shown in FIGS. 1a and 1b have a positive contact 11 and a negative contact 12 being arranged at the end faces of the cylindrical shaped body of each capacitor 2.

In particular, it is provided that the capacitors 2 are free from insulation, i. e. the capacitors 2 are so called "naked" capacitors 2. Furthermore, it is provided that the energy storage device 1 comprises a busbar 5. The busbar 5 preferably has a first conductive layer 31 and a second conductive layer 32, wherein the first conductive layer 31 and the second conductive layer 32 are stacked on each other along a stacking direction S. On top of the second conductive layer 32 an insulation layer 21 is arranged and preferably between the first conductive layer 31 and the second conductive layer 32 a further insulation layer 22 is arranged. In particular, the busbar 5 is laminated in order to form the insulation layer 21. Preferably, it is provided that at the bottom of the first conductive layer 31 another further insulation layer 35 is arranged. In particular, the further insulation layer 35 finishes the bus bar in stacking direction S, is arranged opposite to the naked capacitors 2 and/or covers the whole bottom side of the busbar 5.

For a lower inductance, a higher reliability and an improved cooling behaviour, it is provided that the capacitors 2 are electrically connected to the busbar 5 and are directly arranged on and connected to the busbar 5. In the embodiment shown in FIG. 1 it is provided that the capacitors 2 are orientated such that the positive contact 11 of each of the capacitors 2 is arranged opposite to the busbar 5, i. e. facing away from the busbar 5, and the negative contact 12 of each of the capacitors faces 2 to the busbar 5. Furthermore, it is preferably provided that a distance between two capacitors, in particular the distance between capacitors 2 of the first row 41 and capacitors 2 of the second row 42, is between 0.5 mm and 5 mm, more preferably by a distance between 0.8 mm and 2.5 mm and most preferably by a distance between 1.1 mm and 1.5 mm For connecting the negative contact 12 of the capacitors 2 to the second conductive layer 32 an interlayer connection 9 reaching through the insulation layer 21 is provided. For connecting the positive contacts 11 to the first conductive layer 31 a common connection means 8 is provided, wherein the common connection means 8 contacts the positive contacts 11 of all capacitors 2 simultaneously. Preferably, the connection means 8 is bow-shaped. For example, the connection means 8 is constructed such that the connection means 8 surrounds the arrangement of capacitors 2 and busbar 5 at least on one side, in particular in the region of an edge 7 of the busbar 5, and is directly connected to the first conductive layer 13. In particular, the connection means 8 is constructed such that a clamping force is directed to the capacitors 2. In other words: The connection means 8 comprises a clamping surface 15 being arranged opposite to the busbar 2. Between the busbar 5 and the clamping surface 15 the capacitors 2 are arranged and the clamping force of the clamping surface 15 is directed to the busbar 5. For realizing the clamping force the connection means 8 is flexible, in particular elastic.

Furthermore, it is provided that the arrangement comprising the capacitors 2, the connection means 8 and at least a part of the busbar 5 is arranged in a casing (not shown here). For example the casing is made from metal and/or plastic. It is also possible that the casing is additionally filled with an epoxy, polyurethane and/or the like for fixing the arrangement inside the casing.

In FIGS. 2a and 2b schematically an electrical energy storage device 1 according to a second embodiment is presented in a perspective view (FIG. 2a) and in a cross-sectional view along the A-A line (FIG. 2b). The embodiment of FIG. 2 mainly differs from the embodiment of the FIGS. 1a and 1b in the orientation of the capacitors 2.

In particular, it is provided that the energy storage device 1 comprises a first set of capacitors 2 being arranged in a first row 41 and a second set of capacitors being arranged in a second row 42. The capacitors 2 of the first row 41 are orientated such that the positive contact 11 faces away from the busbar 5 and the negative contact 12 faces to the busbar 5. Simultaneously, the capacitors 2 of the second row 42 are orientated in the opposite direction, i. e. the positive contact 11 faces to the busbar 5 and the negative contact 12 faces away from the busbar 5. Furthermore, it is provided that the capacitors 2 of the first row 41 share a connection mean 8, whereas the capacitors 2 of the second row 42 share a further connection means 8'. For connecting the positive contacts 11 of the capacitors 2 of the second row 42 to the first conductive layer 31 an interlayer connection 9 reaches through the insulation layer 21, the first conductive layer 31 and the further insulation layer 22 to the second conductive layer 32. For connecting the positive contacts 11 of the capacitors 2 of the first row 41 the connector mean 8 is provided, wherein the connector mean 8 is bow shaped and surrounds the capacitors 2 of the first row 41 and the busbar 5 on one side, in particular in the region of the edge 7 of the busbar 5.

Further, it is provided that the negative contacts 12 of the capacitors 2 of the second row 42 are connected to the second conductive layer 32 by a further connection means 8' that reaches through the insulation layer 21. In particular, the further connection means 8' is constructed elastic or flexible such that a further clamping force of a further clamping surface 15' is directed to the busbar 5. As a consequence, it is possible to clamp the capacitors 2 between the busbar 5 and the further clamping surface 15'. Furthermore, the further connection means 8' reaches through the insulation layer 21 in a region C between two capacitors, in particular in a region between a capacitor of the first row 41 and a capacitor 2 of the second row 42. The negative contacts 12 of the capacitors 2 of the first row 41 are connected to the second conductive layer 32 via the interlayer connection 9 reaching through the insulation layer 21.

In FIGS. 3*a* and 3*b* schematically an electrical energy storage device 1 according to a third embodiment is presented in a perspective view (FIG. 3*a*) and in a cross-sectional view (FIG. 3*b*) along the A-A line. The embodiment of the FIGS. 3*a* and 3*b* mainly differs from the embodiment of the FIGS. 2*a* and 2*b* in the orientation of the capacitors 2. In particular, it is provided that the orientation of the capacitors 2 alternates in the first row 41 and the second row 42. In other words: the orientation of the capacitors 2 changes from capacitor 2 to capacitor 2 along the first row 41 and/or the second row 42 and from one capacitor 2 of one row 41, 42 to neighbouring capacitor 2 of the other row 42, 41. Preferably, it is provided that each of the capacitors 2 has its own connection means 8 and/or further connection means 8'.

Thereby, for connecting the positive contact 11 with the first conductive layer 31
- the connection means 8 surrounds the capacitor 2 and busbar 5 and/or
- the interlayer connection 9 reaches through the insulation layer 21, the second conductive layer 32 and the further insulation layer 22 and/or
- the further connector means 8' reaches through the insulation layer 21, the second conductive layer 32 and the further insulation layer 22.

For connecting the negative contacts 12 with the second conductive layer 32
- the interlayer connection 9 reaches through the insulation layer 21 and/or
- the connection means 8 surrounds the capacitor 2 and reaches through the insulation layer 21 on one side and/or
- the further connection means 8' reaches through the insulation layer 21.

In FIG. 4, another kind of capacitor 2 is shown. Preferably, the capacitor 2 shown in FIG. 4 replaces the cylindrical shaped capacitors 2 presented in the FIGS. 1*a* to 3*b*. In general, the present invention is not limited to capacitors 2 having a cross section being shaped as a circle such as the cylindrical shaped capacitors illustrated in the FIGS. 1*a* to 3*b*. It is also thinkable that the cross section is shaped as a polygon, a triangle, an ellipse or the like.

REFERENCE SIGNS

1 electrical energy storage device
2 capacitor
5 busbar
7 edge
8 connection means
8' further connection means
9 interlayer connection
11 positive contact
12 negative contact
15 clamping surface
15 further clamping surface
21 insulation layer
22 further insulation layer
31 first conductive layer
32 second conductive layer
41 first row
42 second row
S direction of stacking

The invention claimed is:

1. An electrical energy storage device (1) comprising
a plurality of capacitors (2), and
a busbar (5) for electric power distribution,
wherein the busbar (5) is covered at least partially by an insulation layer (21) and the capacitors (2) are connected to the busbar (5),
wherein for reducing an inductance of the energy storage device, the capacitors (2) are arranged directly on the insulation layer (21) of the busbar (5); and
wherein at least one of said capacitors (2) is free from an insulation wrap.

2. The electrical energy storage device (1) according to claim 1, wherein the plurality of capacitors (2) comprises a plurality of uninsulated capacitors that are free from an insulation wrap.

3. The electrical energy storage device (1) according to claim 2, wherein the respective uninsulated capacitors are separated from each other by a distance of 0.5 mm to 5 mm.

4. The electrical energy storage device (1) according to claim 1, wherein the busbar (5) comprises a first conductive layer (31) and a second conductive layer (32), wherein the first conductive layer (31) and the second conductive layer (32) are insulated from each other by a further insulation layer (22).

5. The electrical energy storage device (1) according to claim 4, wherein the capacitors (2) are connected to the first conductive layer (31) and/or the second conductive layer (32) by reaching through the insulation layer (21).

6. The electrical energy storage device (1) according to claim 4, wherein the capacitors (2) are connected to the first conductive layer (31) and/or the second conductive layer (32) by a connection means (8).

7. The electrical energy storage device (1) according to claim 6, wherein the connector means (8) is configured such that for fixing the capacitors (2) in an assembled state a clamping force affects the capacitors (2).

8. The electrical energy storage device (1) according to claim 4, wherein a first set of capacitors (2) is arranged in the first row (41) and a second set of capacitors (2) is arranged in the second row (42), wherein
the first set of capacitors (2) and the second set of capacitors (2) are connected to the first conductive layer (31) by a common connector means (8),
the first set of capacitors (2) is connected to the first conductive layer (31) by a connection means (8) and the second set of capacitors (2) is connected to the first conductive layer (31) by a further connection means (8') and/or
the capacitors (2) of the first set of capacitors (2) and the capacitors (2) of the second set of capacitors (2) are each connected to the first conductive layer (31) by the connection means (8) or the further connection means (8'), individually.

9. The electrical energy storage device (1) according to claim 8, wherein the further connection means (8') reaches through the insulation layer (21) and/or a further insulation layer (22).

10. The electrical energy storage device (1) according to claim 1, wherein the capacitors (2), being arranged next to each other on the busbar (5), are connected in series and/or in parallel to produce a capacitor bank.

11. The electrical energy storage device (1) according to claim 1, wherein the capacitors (2) comprise a positive contact (11) and a negative contact (12), wherein the capacitors (2) are orientated such that
   all negative contacts (12) or all positive contacts (11) face away from the busbar (5),
      all negative contacts (12) facing away from the busbar (5) are located in a first row (41) and all positive contacts (11) facing away from the busbar (5) are located in a second row (42) or
      a negative contact (12) of a first capacitor (2) facing away from the busbar (5) is located adjacent to a positive contact (11) of a neighbouring capacitor (2) facing away from the busbar (5) in the first row (41) and/or the second row (42).

12. The electrical energy storage device (1) according to claim 1, wherein the capacitors (2) comprise at least one of
   a metallized film that is wound;
      a dielectric comprising at least one of polyethylene terephthalate (PET), polyethylene naphthalate (PEN), polyphenylene sulphide (PPS), polypropylene (PP), polycarbonate (PC) and the like; and
   a positive contact (11) and a negative contact (12) made from metal being sprayed.

13. A method for producing the electrical energy storage device (1) according to claim 1, comprising the steps:
   providing the busbar (5),
   covering the busbar (5) at least partially by an insulation layer (21),
   arranging the plurality of capacitors (2) on the insulation layer (21) and
   connecting the capacitors (2) to the busbar (5).

14. The method according to claim 13, wherein the capacitors (2) are orientated on the busbar (5) such that the total inductance of the capacitors (2) is minimalized.

15. The method according to claim 13, wherein the capacitors (2) are located at an edge (7) or rim of the busbar (5).

16. The method according to claim 13, wherein the electrical energy storage device (1) is arranged at least partially in a casing.

* * * * *